United States Patent [19]

Picollet

[11] Patent Number: 5,161,287
[45] Date of Patent: Nov. 10, 1992

[54] COUPLING SNAP

[75] Inventor: Roland Picollet, Saint-Jorioz, France

[73] Assignee: Salomon S.A., France

[21] Appl. No.: 593,859

[22] Filed: Oct. 5, 1990

[30] Foreign Application Priority Data

Oct. 6, 1989 [FR] France .................. 89 13505

[51] Int. Cl.⁵ .............................................. A44B 13/02
[52] U.S. Cl. .................................. 24/601.2; 24/601.1; 24/599.9
[58] Field of Search ............... 24/601.2, 601.1, 599.9, 24/599.5, 600.9

[56] References Cited

U.S. PATENT DOCUMENTS

| 1,059,812 | 4/1913 | Barry | 24/601.1 |
| 4,206,940 | 6/1980 | Altabe | 24/599.9 |
| 4,380,101 | 4/1983 | Joubert | 24/601.1 |
| 4,464,813 | 8/1984 | Bakker et al. | 24/601.2 |
| 4,617,704 | 10/1986 | Kasai | 24/601.2 |
| 4,680,837 | 7/1987 | Rubinstein | 24/601.2 |
| 4,868,954 | 9/1989 | Kasai | 24/601.2 |

*Primary Examiner*—Victor N. Sakran
*Attorney, Agent, or Firm*—Pollock, Vande Sande & Priddy

[57] ABSTRACT

Snap made of a plastic material whose body and tongue are molded of a single piece and whose mold joint (9) extends from its rear to its front end and intersects the two lateral sides of the snap body, which are substantially parallel to the plane in which the elastic tongue moves.

13 Claims, 3 Drawing Sheets

COUPLING SNAP

FIELD OF THE INVENTION

The present relates to a snap used to suspend or hook together two elements, one being unitary with the rear extremity of the body of the snap and the other designed to be fastened to the loop of the snap.

BACKGROUND OF THE INVENTION

Various snap models are known. Some are formed from several components which may be made of different materials and assembled after manufacture. This design requires a certain assembly time and, depending on the materials used, the weight of the snap may be variable and substantial, especially when metal is used. In addition, if the tongue is metal and depending on its thickness, the user runs the risk of injury. This thickness is chosen so as to provide strength and elasticity. When metal is used and in order to provide properties ensuring elasticity and tension, the tongue is thin and thus has a sharp edge. Furthermore, depending on the particular use, there is a high risk of corrosion when the snap is partially or completely metallic.

Conventional practice also includes the manufacture of a type of snap molded from a single piece of plastic. Its mold joint is located on the upper surface of the upper part of its body, this surface being parallel to the median horizontal plane of this body. Thus, this kind of snap and its formation mold do not make it possible to obtain a smooth surface on the upper face of its body, thereby depriving it of an aesthetic appearance for some uses. Furthermore, this mode of production does not allow recessed or relief markings obtained from partially or completely closed impressions on this same upper surface. Similarly, the markings deriving from each of the half-parts of the mold will be produced with molding displacements or offsets.

SUMMARY OF THE INVENTION

The snap according to the invention makes it possible to remedy the disadvantages mentioned above. It is simultaneously light, aesthetically pleasing and non-oxidizing, and its manufacture saves time when compared with conventional production methods. Its tongue does not have a sharp edge and it may be produced equally well in uniform or variable sizes.

The body and tongue of the snap according to the invention are molded from a single piece, a fact which appears to represent a not insignificant time saving when compared with a snap assembled from various components. When taken from the mold, the tongue draws apart from the snap body in the known manner; it is put in position using a conventional mechanical means, such as the recovery of the lukewarm material when taken from the mold or by cold countersinking.

Another advantage is added to the first. Indeed, the mold joint extending from the rear to the front end of the snap body intersects the two lateral sides of the snap body, which are substantially parallel to the vertical plane in relation to the snap body in which the elastic tongue moves.

Accordingly, the upper surface of the snap body is free of any mold joint of the type existing in the prior art snaps, and is substantially parallel to the median horizontal plane of its body. Depending on the mold used for the present invention, this upper surface will be smooth or engraved with an impression. In the past, the technique used to mold snaps did not make it possible to reproduce partially or completely closed impressions. In accordance with the invention, an impression can be produced without impairment, and thus may serve as a

BRIEF DESCRIPTION OF THE DRAWINGS

The attached drawings illustrate, by way of example, an embodiment of the snap

DESCRIPTION OF THE PREFERRED EMBODIMENT

Figure 1:
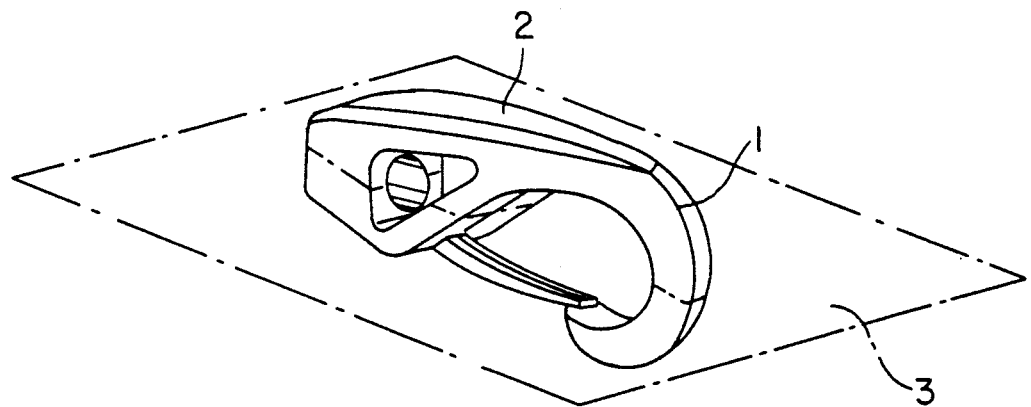
FIG. 1 is a perspective view of a prior art snap.

In FIG. 1, the mold joint 1 of the snap according to the prior art is located on the upper surface 2 of its body, this surface being substantially parallel to the median horizontal plane 3 of the part.

Figure 2:
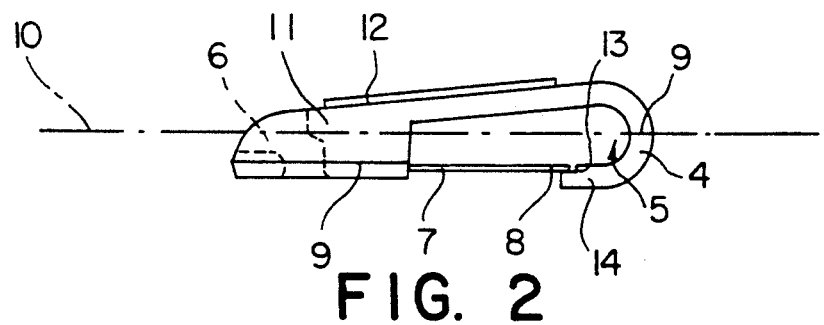
FIG. 2 is a side view of the snap according to the present invention.
Figure 3:
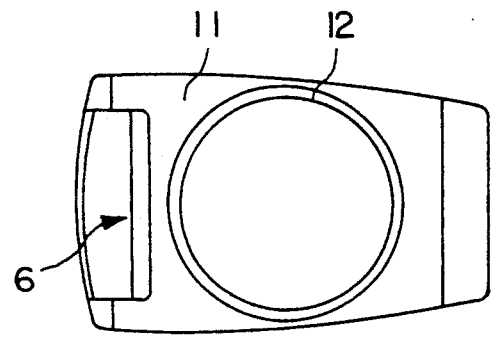
FIG. 3 is a top plan view of the snap.

The snap according to the present invention, shown in FIG. 2, comprises at its front end an open hook 4 whose opening 5 is smaller than the width of the snap. At the rear extremity, the snap comprises a means for hooking onto to a flexible connection piece. This coupling means is preferably a loop 6 whose width equals that of the snap body. The tongue 7 of the snap is cast from one piece with the body of the snap, and its front end 8 rests on the inner end 14 of the hook.

In FIG. 2, the mold joint 9 intersecting the two lateral sides of the snap body is parallel to the median horizontal plane 10 of the snap body. Thus, the upper surface of the snap body 11 may be completely smooth, but it may also be marked with a raised (or recessed, not shown) impression 12 either partially or completely closed.

In the activated position, the tongue 7 and the inner end of the hook 14 are parallel to the mold joint. The end of the hook preferably comprises a notch 13 on and in which the front end 8 of the tongue is housed and rests for support. The size of this notch is at least equal to the thickness of the tongue. Thus, a loop or any other similar means engaged in the snap is not hindered by the end of the tongue 8, thereby avoiding any disturbance of the tongue 7 which may lead to play between the front end of the tongue and the end of the hook, and therefore, untimely detachment of the loop from the snap.

Figure 4:
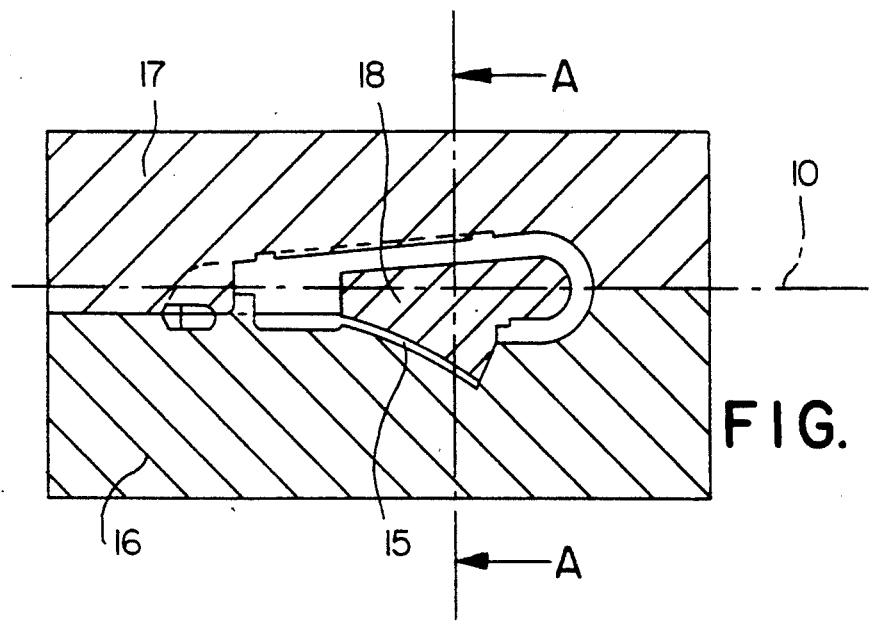
FIG. 4 is a side section view of the snap in its mold during molding thereof.
Figure 5:
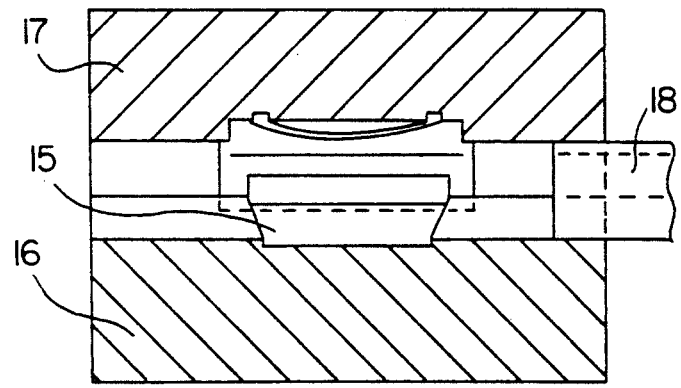
FIG. 5 is a section view along line A—A in FIG. 4 of the molding of the snap in its mold.
Figure 6:
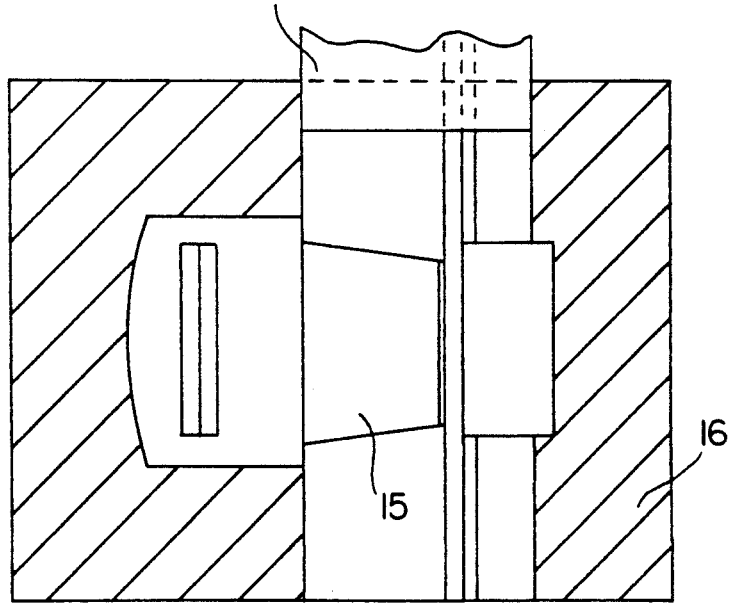
FIG. 6 is a top plan view of the molding of the snap in the movable part of the mold.

The snap according to the invention is formed by conventional molding, especially by injection molding. FIGS. 4, 5 and 6 illustrate a molding technique for the snap. The basic change from molding used previously to produce snaps lies in the orientation of the part to be molded in relation to the various components forming the mold. The snap is molded with the impression of its tongue in outwardly open position 15, the tongue having a parabolic shape in relation to the median horizontal longitudinal plane 10 of the, snap body. As seen in FIGS. 4, 5, and 6, the mold comprises three parts: a movable part 16, a stationary part 17 and at least one mold slide 18. The stationary part 17 bears the impression of the upper part of the body 11 of the snap; the movable part 16 of the mold bears the impression of the lower part of the snap body and the outer surface of the open tongue. The mold slide 18 moves transversely in the direction of the mold opening. Its shape determines the inner profile of the snap and extends up to the lower end of the open tongue. The cooperation and complementarity of the shape of the movable part 16 and of the mold slide 18 determine the parabolic path of the molding of the open tongue 15 and its thickness. Two mold slides are preferably used, thereby making it possible to obtain a molded snap in which the edges of the inner profile of the body may be rounded or bevelled on both sides.

Figure 7:
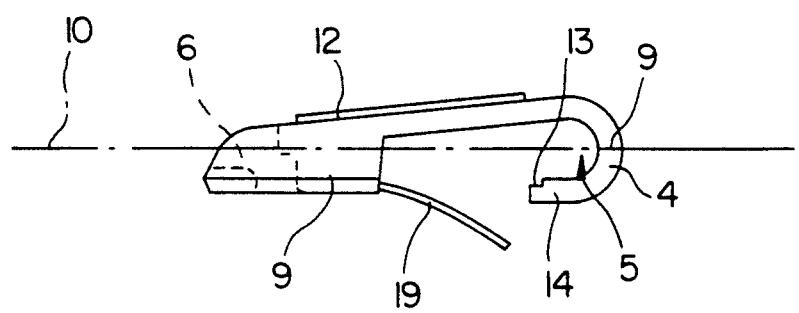

At the time of unmolding, as shown in FIG. 7, the tongue 7 of the snap is in a position 19 open to the outside at a distance from the hook and parabolic in shape in relation to the median horizontal plane of the snap body. The tongue 7 is then slid by manual or mechanical elastic deformation into the position in which it rests for support on the lower end of the hook. This operation is, in particular, facilitated if effected immediately after unmolding, when the plastic material is still lukewarm and thus more easily capable of deformation. The lower end of the tongue and the lower end of the hook preferably have rounded shapes and thus facilitate the sliding of the tongue onto the end of the hook.

What is claimed is:

1. Plastic snap whose body and tongue are molded of a single piece and whose mold joint (9) extends from its rear to its front end, wherein said mold joint intersects the two lateral sides of said body of said snap, said sides being substantially parallel to the plane in which said elastic tongue moves from its activated position onto said front end.

2. Snap according to claim 1, wherein said mold joint 9 is parallel to the median horizontal plane (10) of said snap body.

3. Snap according to claim 1 or 2, wherein the upper surface of said body is completely smooth.

4. Snap according to claim 1 or 2, wherein said upper surface of said body is marked with an impression formed when molded with said body.

5. Snap according to claim 4, wherein said impression is recessed.

6. Snap according to claim 4, wherein said impression is raised.

7. Snap according to claim 1, wherein said body has, at its front end, an open hook (4) substantially in the shape of a half-circle and whose opening is smaller than the width of said snap body.

8. Snap according to claim 1, wherein the rear extremity comprises a means for hooking onto a flexible connection piece.

9. Snap according to claim 8, wherein said hooking means is a loop (6) whose width is equal to that of said snap body.

10. Snap according to claim 1, wherein said tongue (7) and the end (14) of said hook on which said tongue rests for support are substantially parallel to said mold joint.

11. Snap according to claim 10, wherein said front end of said hook comprises a notch having a size at least equal to the thickness of said tongue and supporting said front end of said tongue.

12. Snap according to claim 1, wherein the ridge joining said upper surface of said tongue to its end field is rounded respectively.

13. Process of injection molding a plastic snap having a unitary body, hook and tongue, comprising the step, at a time of unmolding, of moving said tongue by elastic deformation from a position in which it is open outward at a distance from said hook and has a parabolic shape relative to a median horizontal plane of said body, into a position in which it rests for support on an inner end of said hook, said process being carried out in a mold comprising a stationary part, a movable part, and at least one mold slide, wherein:

(a) said stationary part of said mold bears an impression of an upper part of said body;

(b) said movable part of said mold bears an impression of a lower part of said body and an outer surface of said tongue in said open position; and (c) at least one mold slide moves transversely in a direction of an opening of said mold, determines an inner shape of said snap, and extends up to a front end of said tongue in said open position, thus delimiting an upper surface of said tongue.

* * * * *